US012796649B2

(12) United States Patent
Bertilsson

(10) Patent No.: US 12,796,649 B2
(45) Date of Patent: Nov. 17, 2026

(54) MILKING SYSTEM

(71) Applicant: DELAVAL HOLDING AB, Tumba (SE)

(72) Inventor: Anders Bertilsson, Tumba (SE)

(73) Assignee: DeLaval Holding AB, Tumba (SE)

( * ) Notice: Subject to any disclaimer, the term of this patent is extended or adjusted under 35 U.S.C. 154(b) by 532 days.

(21) Appl. No.: 18/259,724

(22) PCT Filed: Dec. 21, 2021

(86) PCT No.: PCT/SE2021/051299
§ 371 (c)(1),
(2) Date: Jun. 28, 2023

(87) PCT Pub. No.: WO2022/146221
PCT Pub. Date: Jul. 7, 2022

(65) Prior Publication Data

US 2024/0065220 A1 Feb. 29, 2024

(30) Foreign Application Priority Data

Dec. 31, 2020 (SE) .................................... 2051578-9

(51) Int. Cl.
*A01J 5/007* (2006.01)
*A01J 5/04* (2006.01)

(52) U.S. Cl.
CPC ............. *A01J 5/0075* (2013.01); *A01J 5/007* (2013.01); *A01J 5/048* (2013.01); *A01J 5/04* (2013.01)

(58) Field of Classification Search
CPC .. A01J 5/0075; A01J 5/048; A01J 5/04; A01J 5/007
See application file for complete search history.

(56) References Cited

U.S. PATENT DOCUMENTS 3,187,719 A * 6/1965 Jones ........................ A01J 5/04 119/14.08
6,073,579 A 6/2000 Innings et al.
(Continued)

FOREIGN PATENT DOCUMENTS

CN 105494109 A * 4/2016 ............. A01J 5/007
EP 1369029 A2 12/2003
(Continued)

OTHER PUBLICATIONS

Office Action, issued in Japanese Patent Application No. 2023533967 dated Jun. 3, 2025.
(Continued)

*Primary Examiner* — Kenneth M Lo
*Assistant Examiner* — Zachary Andrew Cain
(74) *Attorney, Agent, or Firm* — NIXON & VANDERHYE

(57) ABSTRACT

A milking system equipped with teat cups each connected to a respective milk evacuation tube, a vacuum pump, a milk tank, vacuum regulators configured to control a vacuum pressure level prevailing in the teat cup, vacuum pressure sensors each configured to measure vacuum pressure level prevailing under one of the teats, an animal identification sensor, a database, a processing device configured to: determine animal ID, extract data of each respective teat from the database, determine a teat specific vacuum pressure level at each teat, and generate a command to each vacuum regulator, to set the teat specific vacuum pressure level at each teat cup.

14 Claims, 5 Drawing Sheets

(56) References Cited

U.S. PATENT DOCUMENTS

| | | | | |
|---|---|---|---|---|
| 6,651,583 | B1 * | 11/2003 | Lind | A01J 5/007 119/14.02 |
| 2003/0226506 | A1 * | 12/2003 | van den Berg | A01J 5/007 119/14.02 |
| 2008/0127896 | A1 * | 6/2008 | Petterson | A01J 5/007 119/14.08 |
| 2009/0177418 | A1 | 7/2009 | Innings et al. | |
| 2014/0020633 | A1 * | 1/2014 | Dole | A01J 7/04 119/664 |
| 2015/0313172 | A1 * | 11/2015 | Johnston | A01J 5/007 119/14.14 |
| 2019/0141942 | A1 * | 5/2019 | Wallace | A01J 5/0075 119/14.38 |
| 2019/0327933 | A1 * | 10/2019 | Svahn | A01K 1/12 |

FOREIGN PATENT DOCUMENTS

| | | | | |
|---|---|---|---|---|
| EP | 1514469 | A1 | 3/2005 | |
| JP | 2000004704 | A | 1/2000 | |
| JP | 2003514555 | A | 4/2003 | |
| WO | WO-2012022356 | A1 * | 2/2012 | A01J 5/007 |
| WO | 2017190196 | A1 | 11/2017 | |
| WO | 2019156619 | A1 | 8/2019 | |

OTHER PUBLICATIONS

Search Report for SE Application No. 2051578-9 dated Sep. 7, 2021, 2 pages.

International Search Report for PCT/SE2021/051299 dated Mar. 3, 2022, 5 pages.

Written Opinion of the ISA for PCT/SE2021/051299 dated Mar. 3, 2022, 8 pages.

* cited by examiner 400
401a
402a
Milk flow
pressure
t 401b
402b
Milk flow
pressure
t 401c
402c
Milk flow
pressure
t 401d
402d
Milk flow
pressure
t t0
t1
t2
t3

MILKING SYSTEM

CROSS-REFERENCE TO RELATED APPLICATIONS

This application is the U.S. national phase of International Application No. PCT/SE2021/051299 filed Dec. 21, 2021 which designated the U.S. and claims priority to SE Patent Application No. 2051578-9 filed Dec. 31, 2020, the entire contents of each of which are hereby incorporated by reference.

TECHNICAL FIELD

The invention refers to milking systems. More particularly, a milking system is described, comprising a plurality of teat cups, a plurality of milk evacuation tubes, a vacuum pump, a milk tank, a plurality of vacuum regulators, a plurality of vacuum pressure sensors, an animal identification sensor, a database and a processing device for controlling a teat specific vacuum pressure level to be applied at each respective teat of an animal during a milking session.

BACKGROUND

On a dairy farm, milk is typically extracted from the animals by attaching a teat cup with a liner on each teat of the animal and apply milking vacuum under the tip of the teat, in addition to a pulsation vacuum. Hereby, the rhythmical suckling of a calf is imitated so that sucking by the milking vacuum is interrupted by rhythmical motions, opening and closing of the liner caused by the pulsation vacuum. Consequently, the teats are exposed to massage which stimulates oxytocin release of the animal, which in turn activates the milk ejection reflex, resulting in milk release of alveoli milk about 40-60 seconds after attachment of the first teat cup onto the first teat. Also, congestion in the teat end is prevented by the applied massage.

It is desired to evacuate the milk from the animal as fast as possible (for using the milking equipment efficiently and allowing a maximum number of animals to be milked) while avoiding injury on the teats due to excessive milking vacuum.

However, the milk flow of the teats of an animal is typically not equally distributed between the teats, for different reasons, e.g., genetic variations and/or that a teat may have a deviating size/shape making it less suitable for the applied teat cup/liner (the same teat cup/liner size is typically applied on all the teats independently of the actual teat size).

Not only the milk flow is unequally distributed, but also the increase rate of the milk flow during stimulation of the respective teat is different. Milk flow per time unit may be different for all teats of the animal during a milking session.

It has been observed that at least some animals do not release milk at a higher milk flow even when the milking vacuum is increased radically. An increased applied milking vacuum of animal teats, for these animals, only leads to exposing the teats for the high milking vacuum, which may harm the teat.

These above-mentioned features may coincide and reinforce each other, which exacerbates the problems.

It would be desired through further investigations and development to evolve a concept for improved milk evacuation in terms of time and efficiency while ensuring and/or enhancing a satisfying teat integrity.

SUMMARY

It is therefore an object of this invention to solve at least some of the above problems and improve milking of an animal within a milking system.

According to a first aspect of the invention, this objective is achieved by a milking system that comprises a plurality of teat cups, each configured to fit on a respective teat of an animal during milk extraction in a milking session. The milking system also comprises a plurality of milk evacuation tubes, wherein each milk evacuation tube is connected to a respective teat cup. In addition, the milking system comprises a vacuum pump, configured to generate a vacuum pressure, which may be referred to as system vacuum. The milking system furthermore comprises a milk tank, connected to each of the teat cups via the respective connected milk evacuation tube, and also connected to the vacuum pump. Also, the milking system comprises a plurality of vacuum regulators wherein each vacuum regulator is associated with one teat cup, and configured to control a vacuum pressure level prevailing in the associated teat cup, under the teat. The milking system comprises a plurality of vacuum pressure sensors wherein each vacuum pressure sensor is associated with one teat cup and configured to measure vacuum pressure level prevailing in the associated teat cup under one of the teats during milk extraction of the milking session. In addition, the milking system comprises an animal identification sensor configured to capture animal-unique information of the animal. The milking system furthermore comprises a database configured to store data related to at least one earlier milking session of each respective teat of the animal, associated with an identity reference of the animal. The milking system also comprises a processing device, communicatively connected to the vacuum regulators, the vacuum pressure sensors, the animal identification sensor and the database. The processing device is configured to determine an identity reference of the animal to be milked, based on animal-unique information obtained from the animal identification sensor. The processing device is also configured to extract data of each respective teat of the identified animal from the database based on the determined identity reference. Furthermore, the processing device is configured to determine a teat specific vacuum pressure level to be applied at each respective teat at a time-period from beginning of the milking session, when the teat cup is attached to the respective teat, based on the extracted data. The processing device is in addition configured to generate a respective command to each vacuum regulator, to set the determined teat specific vacuum pressure level at each respective teat cup.

By measuring the respective vacuum pressure level under each teat and comparing it with a previously stored teat specific vacuum pressure level applied to each respective teat, the processing device may set the vacuum pressure level at each teat cup by generating a respective command to the corresponding vacuum regulator associated with the teat cup. The teat specific vacuum pressure level could thus be tailored to a level which secures teat integrity while enabling a high vacuum pressure level for teats having a high milk flow.

Thereby, by adapting the teat specific vacuum pressure level to the milk flow of each individual teat, milk extraction is radically improved. The total milking time of each animal being served in a milking station/milking robot (in comparison with conventional solutions) is reduced which makes it possible to serve more animals per time unit at the milking system. Yet, milking is performed in a gentle manner, eliminating, or at least reducing inconvenience of the animal caused by excessive vacuum pressure under the teats. Excessive vacuum pressure may cause injuries which in turn may encourage udder diseases such as mastitis, which may have severe economical consequences of the farm, besides the suffering of the individual animal.

In an implementation of the milking system according to the first aspect, the milking session begins either when a pre-treatment is performed on the first teat, or when the first teat cup is applied to the first teat.

By defining a particular moment in time when the milking session begins, a distinct and un-ambiguous fixed point is established, which facilitates calculations and control of the processing device.

In yet an implementation of the milking system according to the first aspect, the processing device is configured to determine a vacuum profile to be applied to each respective teat of the animal during the milking session, based on the extracted data. The processing device is also configured to generate a respective command to each vacuum regulator, to control the respective vacuum pressure level prevailing at each associated teat cup under the teat, according to the corresponding vacuum profile of the respective teat.

The applied teat specific vacuum pressure level may thereby be adapted to a milk flow of a teat which is varying over time during the milking session, leading to application of a highest vacuum pressure level as could be tolerated by the milk flow of the teat. The total time of the milking session could thereby be additionally reduced, while not abusing the teats by excess vacuum.

In yet another implementation of the milking system according to the first aspect, the vacuum profile comprises a constant vacuum pressure level under the teat, which vacuum pressure level is to be maintained during the milking session.

In another implementation of the milking system according to the first aspect, the vacuum profile comprises vacuum pressure levels under the teat, which vacuum pressure levels varies over time during the milking session.

In yet another implementation of the milking system according to the first aspect, the milking system comprises a communication device for communication with a central processing device of a service provider. The processing device is configured to provide data of the animal and/or the identity reference of the animal to the central processing device of the service provider via the communication device. The processing device is also configured to obtain the vacuum profile to be applied for each respective teat of the animal during the milking session from the central processing device.

By making the computations and/or data storage on a central unit instead of keeping the processing capacity locally at the farm, several advantages are achieved. The farmer does not have to bother concerning program updates and computer security issues. Program updates due to recent developments and innovation of the service provider may instantly be implemented at the central processing unit.

In yet another implementation of the milking system according to the first aspect, the processing device is configured to continuously obtain a respective vacuum pressure level under each of the teats, from the corresponding vacuum pressure sensor during the milking session. The processing device is configured to compare the obtained respective vacuum pressure levels with the respective vacuum profile. In addition, the processing device is also configured to, if the obtained vacuum pressure level differs from the vacuum pressure level of the vacuum profile, generate a respective command to each vacuum regulator, to adjust the respective vacuum pressure level at each teat cup, according to the corresponding vacuum profile of the respective teat.

Thus, a continuous surveillance and adjustment of the applied vacuum pressure level at each teat is achieved, enabling an uninterrupted monitoring and setting of teat specific vacuum pressure level.

In yet another implementation of the milking system according to the first aspect, the teat cup comprises a liner, which is caused to open and close repeatedly under the teat during the milking session; and wherein the vacuum pressure sensor is configured to measure the vacuum pressure level at least two times during a time period when the liner is open.

By being able to measure the vacuum pressure level frequently, at least when the liner is open and the teat is exposed to the vacuum, a better control of the current/instantaneous vacuum pressure is achieved. It also becomes possible to detect a change rate in milk flow. A large difference between two measurements, in case of either quick increase/decrease in milk flow may trigger that the vacuum pressure level may be changed in larger steps than when a small difference is detected. An adaptation of the applied vacuum pressure level may then be made via the vacuum regulator associated with the teat cup. It thereby becomes possible to provide each teat with an appropriate vacuum pressure level for time-efficient milking while avoiding vacuum caused damages or irritation of the teats.

In yet another implementation of the milking system according to the first aspect, the vacuum pressure sensor is configured to measure vacuum pressure level with substantially 10-1000 measurements per second, preferably 100-1000 measurements per second.

The more frequently the vacuum pressure level under each teat is measured, the more precise fine tuning of the applied vacuum pressure level could be made for maintaining the determined teat specific vacuum pressure level also when there are deviations in the milk flow of the animal in comparison with earlier milking sessions.

In yet another implementation of the milking system according to the first aspect, the processing device is configured to calculate a rolling average of vacuum pressure levels prevailing at each teat cup under the respective teat, based on a predetermined number of latest vacuum pressure levels obtained from the respective associated vacuum pressure sensor. The comparison with the vacuum profile is made with the calculated rolling average of vacuum pressure levels.

The calculated rolling average of for example the latest 5 or 10 measured vacuum pressure levels evens out arbitrary fluctuations in the measurements, resulting in a more reliable and stable comparison with the vacuum profile/determined teat specific vacuum pressure level.

In yet another implementation of the milking system according to the first aspect, the processing device is configured to repeatedly, generate a command to the vacuum regulator associated with the teat cup applied to the respective teat, to either increase the vacuum pressure level under the teat with a step when the latest obtained vacuum pressure level under the teat, obtained from the vacuum pressure sensor is lower than a previously obtained vacuum pressure level under the teat. Or, to decrease the vacuum pressure level under the teat with the step when the latest obtained vacuum pressure level under the teat, obtained from the vacuum pressure sensor exceeds the previously obtained vacuum pressure level under the teat.

Thereby the vacuum pressure level could be adapted in real time. By comparing two subsequent measurements of vacuum pressure levels, a rate of change could be determined which is indicating direction and size of the subsequent vacuum pressure level.

In yet another implementation of the milking system according to the first aspect, the size of the step is proportional to a difference between the latest obtained vacuum pressure level and the previously obtained vacuum pressure level, such as for example the penultima obtained vacuum pressure level.

By instructing the vacuum regulator to change the vacuum pressure in a step size which may be proportional to the detected difference between the measurements, it is avoided that an inappropriate vacuum pressure level is applied to the teat, which does not match the current milk flow.

In yet another implementation of the milking system according to the first aspect, the processing device is configured to detect that the vacuum pressure level under one of the teats exceeds a maximum allowed vacuum pressure level, based on a measurement of the vacuum pressure level obtained from the vacuum pressure sensor associated with the teat cup attached to the teat. The processing device is also configured to generate a command to the vacuum regulator associated with the teat cup attached to the teat, to decrease the vacuum pressure level under the teat.

It is hereby avoided that a teat is exposed for an excessive vacuum pressure in case the milk flow of the teat is not corresponding to the applied vacuum pressure. Thereby a gentle treatment of the teat of the animal is ascertained yet enabling application of an efficient vacuum pressure adapted to the teat capacity which ameliorates and streamline the milking session, as the milk thereby is evacuated in short time while not abusing teat integrity of the animal.

In yet another implementation of the milking system according to the first aspect, the processing device is configured to provide data related to the latest milking session of each respective teat of the identified animal, to the database, for storage therein, associated with the specific teat, the identity reference of the animal and a time reference.

The stored data may be different in different implementations and comprise milk production of each teat of the animal, a vacuum profile to be followed during the milking session, and/or an initial teat specific vacuum pressure level to be applied at least during beginning of the milking session. By continuously updating the stored data, development in milk yield over the lactation cycle of the animal is compensated for and may even be predicted.

In yet another implementation of the milking system according to the first aspect, the processing device is configured to detect a difference between previously stored data related to at least one milking session of one teat of the animal and corresponding data related to the latest milking session of the teat exceeding a threshold limit. Also, the processing device is configured to generate an alert to be output when the difference is detected.

In case the deviation in outcome between two milking sessions, either in milk yield or applied vacuum pressure, is too large (i.e., exceeding the threshold limit) the reason may be that the animal is suffering from mastitis, infection or some other disease and may require appropriate professional treatment. By detecting a disease and commence treatment early, the animal is likely to recover earlier, reducing the period of illness of the animal.

In yet another implementation of the milking system according to the first aspect, the processing device is configured to determine a time period between the last milking session of the animal and the current moment in time when the animal is about to commence the subsequent milking session. The processing device is configured to determine the teat specific vacuum pressure level to be applied at each respective teat also based on the determined time period.

By adjusting the determined teat specific vacuum pressure level and/or vacuum profile based on the time period, a vacuum pressure level and/or vacuum profile which is more corresponding to an expected milk flow of the animal is provided.

Hereby, a time efficient, yet teat friendly milk extraction is provided.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a milking system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
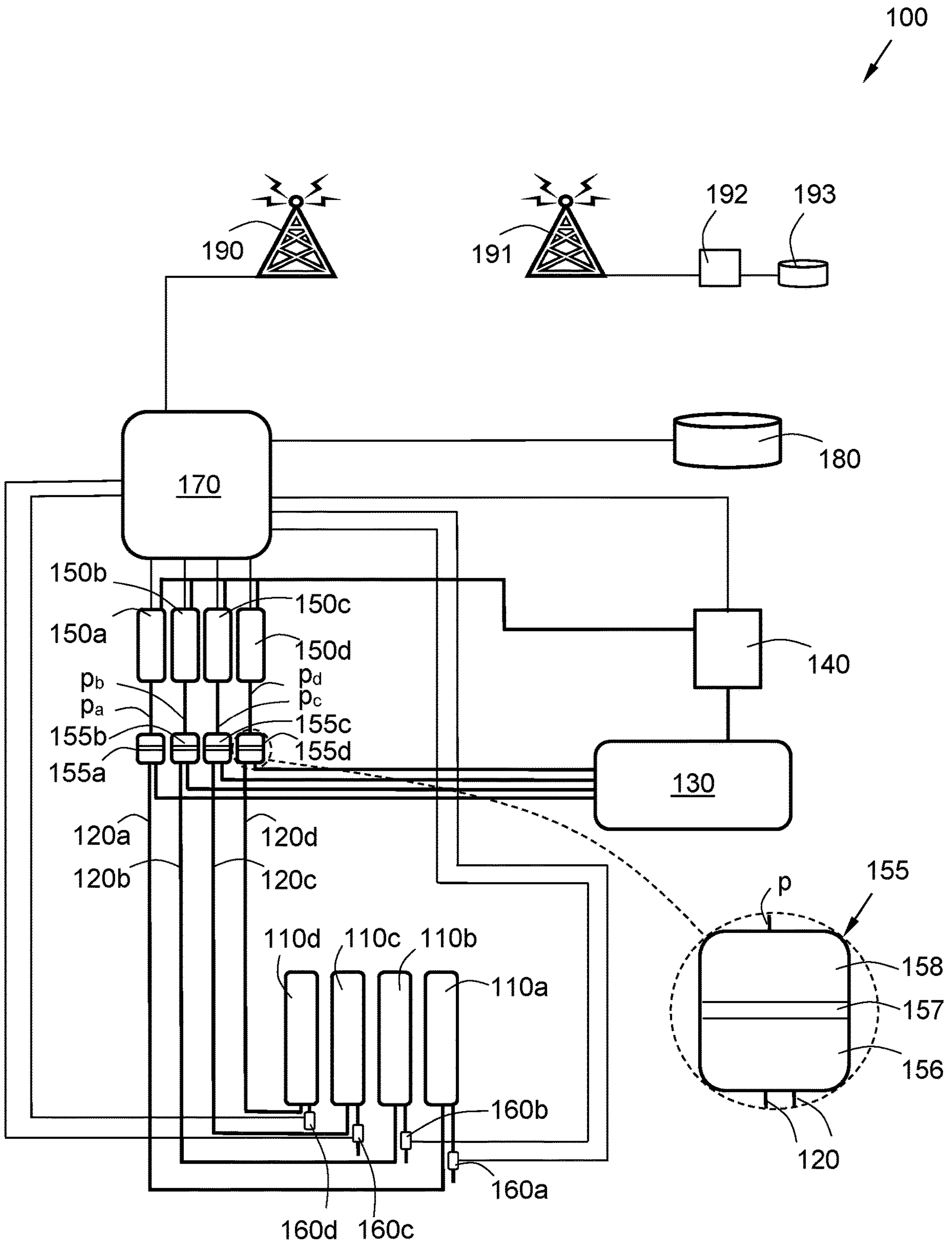
FIG. 1 illustrates a milking system according to an embodiment.

FIG. 1 illustrates a milking system 100 configured to extract milk from an animal during a milking session. The animal may be comprised in a herd of animals for dairy farming at a farm. The milking system 100 may with advantage, although not necessarily, be implemented in an automatic milking facility, for example a milking robot, which is arranged for voluntary milking of freely strolling animals, wherein the animals may visit the milking facility/milking system 100 in order to be milked when desired.

"Animal" may be any arbitrary type of domesticated female mammal such as e.g. cow, goat, sheep, camel, horse, dairy buffalo, donkey, yak, etc. The animal may have four teats, as for example cows, or two teats, such as for example goats and/or sheep (non-exhaustive list). Other animals may have other numbers of teats.

The milking system 100 comprises a plurality of teat cups 110*a*, 110*b*, 110*c*, 110*d*. The number of teat cups 110*a*, 110*b*, 110*c*, 110*d* is typically identical with the number of teats of the animal to be milked within the milking system 100. Each teat cup 110*a*, 110*b*, 110*c*, 110*d* is configured to fit on a respective teat of the animal and to be attached thereto during milk extraction in the milking session.

Each teat cup 110*a*, 110*b*, 110*c*, 110*d* is connected to a respective milk evacuation tube 120*a*, 120*b*, 120*c*, 120*d*, leading evacuated milk from the respective teat, to a connected milk tank 130. The milk tank 130 is in turn connected to a vacuum pump 140 that has generated and/or continuously generates a system vacuum pressure of the milk tank 130. The system vacuum pressure may be for example somewhere between about 48-55 kPa.

The expressions "vacuum pressure" and/or "milking vacuum" and/or "system vacuum pressure" refers to underpressure in comparison with the environmental atmospheric pressure, The milk tank 130 may collect milk evacuated during the milking session, which may be forwarded via a pump arrangement and a tubing, to a connected cooling tank where the milk may be collected and maintained at chilled temperature.

The milking system 100 also comprises a plurality of vacuum regulators 150*a*, 150*b*, 150*c*, 150*d*. The vacuum pump 140 is connected to each vacuum regulator 150*a*, 150*b*, 150*c*, 150*d*, thereby providing system vacuum to the vacuum regulators 150*a*, 150*b*, 150*c*, 150*d*.

Each vacuum regulator 150*a*, 150*b*, 150*c*, 150*d* comprises a solenoid wherein position of a valve of the solenoid may be adjusted by adjusting a magnetic field surrounding the solenoid for example with a Pulse Width Modulation (PWM) signal generated by a processing device 170 communicatively connected to the vacuum regulators 150*a*, 150*b*, 150*c*, 150*d*, thereby changing a mixture of system vacuum of the vacuum pump 140 and air of atmospheric pressure for generating a control vacuum p.

The vacuum regulators 150*a*, 150*b*, 150*c*, 150*d* may comprise or be connected to a respective valve device 155*a*, 155*b*, 155*c*, 155*d*. The valve device 155*a*, 155*b*, 155*c*, 155*d* is arranged in the respective milk evacuation tube 120*a*, 120*b*, 120*c*, 120*d*, associated with the respective teat cup 110*a*, 110*b*, 110*c*, 110*d*.

The valve device 155*a*, 155*b*, 155*c*, 155*d* comprises a wet section 156 and a dry section 158, separated by a membrane 157. The milk evacuation tube 120*a*, 120*b*, 120*c*, 120*d* is passing the wet section 156 of the valve device 155*a*, 155*b*, 155*c*, 155*d*.

The vacuum pressure level prevailing in the teat cup 110*a*, 110*b*, 110*c*, 110*d* associated with the milk evacuation tube 120*a*, 120*b*, 120*c*, 120*d*, upstreams the valve device 155*a*, 155*b*, 155*c*, 155*d* is adjusted to the same vacuum level as the control vacuum level p provided to the dry section 158 of the valve device 155*a*, 155*b*, 155*c*, 155*d* by the vacuum regulator 150*a*, 150*b*, 150*c*, 150*d*.

Thus, the vacuum pressure level prevailing in the teat cup 110*a*, 110*b*, 110*c*, 110*d* under the teat may be adjusted individually.

The valve device 155*a*, 155*b*, 155*c*, 155*d* may for example comprise a per se known shut off valve.

In addition, the milking system 100 comprises a plurality of vacuum pressure sensors 160*a*, 160*b*, 160*c*, 160*d*. Each vacuum pressure sensor 160*a*, 160*b*, 160*c*, 160*d* is associated with one teat cup 110*a*, 110*b*, 110*c*, 110*d* and is configured to measure vacuum pressure level prevailing in the associated teat cup 110*a*, 110*b*, 110*c*, 110*d* under one of the teats during milk extraction of the milking session. Thus, one vacuum pressure sensor 160*a*, 160*b*, 160*c*, 160*d* may be dedicated to measuring vacuum pressure level prevailing in one specific teat cup 110*a*, 110*b*, 110*c*, 110*d* under one of the teats.

The milking system 100 furthermore comprises a database 180 configured to store data related to at least one earlier milking session of each respective teat of the animal, associated with an identity reference of the animal and/or possibly also with a time reference. The stored data may for example comprise milk extraction per time unit for each teat during a milking session and/or vacuum level/vacuum profile to be maintained during the milking session.

The milking session may be regarded as beginning when a pre-treatment is performed on the first teat of the animal, which starts stimulation of oxytocin release of the animal. The pre-treatment may comprise cleaning of the teat, by rinsing the teat with water, treating the teat with a brush or otherwise teasing/stimulating the teat. The required timeperiod from the start of the pre-treatment to release of alveoli milk may be about 40-60 seconds; however, this time may be different for different breeds, different individual animals and also for the same animal in different situations and may be regarded as merely a rough estimation.

However, pre-treatment may not be performed at all farms. In case pre-treatment is not performed, the milking session may be considered to begin when the first teat cup 110*a*, 110*b*, 110*c*, 110*d* is attached to the first teat.

The vacuum profile may comprise a constant vacuum pressure level under the teat to be maintained during the milking session, in some embodiments. Alternatively, in other embodiments, the vacuum profile may comprise a plurality of vacuum pressure levels under the animal teat that varies over time during the milking session.

In addition, the milking system 100 also comprises a processing device 170 which is communicatively connected to the vacuum regulators 150*a*, 150*b*, 150*c*, 150*d*, the vacuum pressure sensors 160*a*, 160*b*, 160*c*, 160*d*, an animal identification sensor and the database 180, for instance via a wireless connection based on radio or optical technique, or a wired connection implemented by electric cable or optic fibre.

The vacuum pressure sensor 160*a*, 160*b*, 160*c*, 160*d* may be configured to measure vacuum pressure level with substantially 10-1000 measurements per second, preferably 100-1000 measurements per second, in some embodiments.

The vacuum pressure sensor 160*a*, 160*b*, 160*c*, 160*d* may also be configured to measure the vacuum pressure level at least two times during a time period when a liner is open, in yet some embodiments.

The processing device 170 is configured to determine an identity reference of the animal to be milked, based on animal-unique information obtained from the animal identification sensor. The processing device 170 is also configured to extract data of each respective teat of the identified animal from the database 180 based on the determined identity reference. Additionally, the processing device 170 is configured to determine a teat specific vacuum pressure level to be applied at each respective teat at a time-period from beginning of the milking session, when the teat cup 110*a*, 110*b*, 110*c*, 110*d* is attached to the respective teat, based on the extracted data. The processing device 170 is also configured to generate a respective command to each vacuum regulator 150*a*, 150*b*, 150*c*, 150*d*, to set the determined teat specific vacuum pressure level at each respective associated teat cup 110*a*, 110*b*, 110*c*, 110*d*.

In some embodiments, the processing device 170 may also be configured to determine a vacuum profile to be applied to each respective teat of the animal during the milking session, based on the extracted data. Also, the processing device 170 may be configured to generate a respective command to each vacuum regulator 150*a*, 150*b*, 150*c*, 150*d*, to control the respective vacuum pressure level prevailing at each associated teat cup 110*a*, 110*b*, 110*c*, 110*d* under the teat, according to the corresponding vacuum profile of the respective teat.

The milking system 100 may also in some embodiments comprise a communication device 190 for communication with a central processing device 192 of a service provider. The central processing device 192 may in turn be connected to a central database 193 wherein various related data may be stored.

The processing device 170 at the farm may be configured to provide data of the animal and/or the identity reference of the animal to the central processing device 192 of the service provider via the communication device 190. The vacuum profile to be applied for each respective teat of the animal during the milking session may be obtained from the central processing device 192.

The processing device 170 may in yet some embodiments be configured to obtain continuously a respective vacuum pressure level under each of the teats, from the corresponding vacuum pressure sensor 160*a*, 160*b*, 160*c*, 160*d*, during the milking session. Also, the processing device 170 may be configured to compare the obtained respective vacuum pressure levels with the respective vacuum profile. A direct, real time (or almost real time) control of vacuum pressure levels under the teat is enabled. In case the obtained vacuum pressure level differs from the vacuum pressure level of the vacuum profile, the processing device 170 may generate a respective command to each vacuum regulator 150*a*, 150*b*, 150*c*, 150*d*, to adjust the respective vacuum pressure level at each associated teat cup 110*a*, 110*b*, 110*c*, 110*d*, according to the corresponding vacuum profile of the respective teat.

In some embodiments, the processing device 170 may be configured to calculate a rolling average of vacuum pressure levels prevailing at each teat cup 110*a*, 110*b*, 110*c*, 110*d* under the teat 210*a*, 210*b*, 210*c*, 210*d*, based on a predetermined number of latest vacuum pressure levels obtained from the respective associated vacuum pressure sensor 160*a*, 160*b*, 160*c*, 160*d*, such as the five latest measurements, ten latest measurements, etc. Also, the processing device 170 may be configured to perform the comparison with the vacuum profile based on the calculated rolling average of vacuum pressure levels for each respective teat 210*a*, 210*b*, 210*c*, 210*d*. Hereby, deviations in measurement results due to arbitrary fluctuations in measurement results is evened out, leading to more reliable measurements of vacuum pressure levels under the teat.

The processing device 170 may be configured to repeatedly generate a command to the vacuum regulator 150*a*, 150*b*, 150*c*, 150*d* associated with the teat cup 110*a*, 110*b*, 110*c*, 110*d* attached to the teat, to adjust the vacuum pressure level under the teat. The adjustment may comprise increasing the vacuum pressure level under the teat with a step when the latest obtained vacuum pressure level under the teat, obtained from the vacuum pressure sensor 160*a*, 160*b*, 160*c*, 160*d* is lower than a previously obtained vacuum pressure level under the teat, i.e., that the vacuum pressure level under the teat is decreasing. The previously obtained vacuum pressure level may for example be the penultima obtained vacuum pressure level, or alternatively an earlier made measurement.

Also, or alternatively, the adjustment may comprise decreasing the vacuum pressure level under the teat with the step when the latest obtained vacuum pressure level under the teat, obtained from the vacuum pressure sensor 160*a*, 160*b*, 160*c*, 160*d* exceeds the previously obtained vacuum pressure level under the teat.

In some embodiments, the size of the step may be proportional to a difference between the latest obtained vacuum pressure level and the previously obtained vacuum pressure level.

Thus, a detected large difference between two subsequent measurements of the vacuum pressure level under the teat may trigger a large adjustment via the vacuum regulator, of the applied vacuum pressure level under the teat, and vice versa.

The processing device 170 may in some embodiments be configured to detect that the vacuum pressure level under one of the teats exceeds a maximum allowed vacuum pressure level, based on a measurement of the vacuum pressure level obtained from the vacuum pressure sensor 160*a*, 160*b*, 160*c*, 160*d* associated with the teat cup 110*a*, 110*b*, 110*c*, 110*d* attached to the teat. The processing device 170 may then be configured to generate a command to the vacuum regulator 150*a*, 150*b*, 150*c*, 150*d* associated with the teat cup 110*a*, 110*b*, 110*c*, 110*d* attached to the teat, to decrease the vacuum pressure level under the teat.

The maximum allowed vacuum pressure level may be set to for example 38 kPa, 42 kPa, etc. The maximum allowed vacuum pressure level may be set differently for different teats. It is thereby ascertained that the teats are not harmed due to excess vacuum pressure.

In some embodiments, the processing device 170 may also be configured to provide data related to the latest milking session of each respective teat of the identified animal, to the database 180, for storage therein, associated with the specific teat, the identity reference of the animal and a time reference.

The processing device 170 may in some embodiments be configured to detect a difference between previously stored data related to milking sessions of one teat of the animal and milk flow data of the latest milking session of the teat exceeding a threshold limit, such as for example 10%, 20% or similar. The processing device 170 may then be configured to generate an alert to be output when the difference is detected.

The alert may for example be output on a mobile telephone, computer, and/or a wearable electronic device of the farmer, such as an intelligent watch and/or intelligent glasses or similar device. The alert may also, or alternatively be output on a loudspeaker and/or display arranged at the farm.

The processing device 170 is with general advantage configured to perform the above-described procedure in an automatic manner by executing a computer program. Therefore, according to some embodiment, the processing device 170 may comprise a memory unit, i.e., non-volatile data carrier, storing the computer program, which, in turn, may contain soft-ware for making a processing circuitry in the form of at least one processor in the processing device 170 to execute the above-described actions when the computer program is run on the processing circuitry.

In some embodiments, the processing device 170 is configured to determine a time period between the last milking session of the animal and the current moment in time when the animal is about to commence the subsequent milking session. The moment in time of the last milking session for the particular animal may be stored in the database 180, associated with the identity reference of the animal.

In case the time period is longer than expected, for example 20% longer, it may be expected that the animal has produced more milk than otherwise, which may influence the shape of the milking curve. It may also influence the amount/time of pre-stimulation required for the respective teats of the animal and/or the level of the milk flow per time unit for the teat. Thus, an extended time period (in comparison with an average time period) may render an increased teat specific vacuum pressure level to be applied at each respective teat and/or vacuum profile and vice versa. The adjustment of the teat specific vacuum pressure level and/or vacuum profile may be made with regard to the size of the deviation between the determined time period and the average time period in some embodiments, leading to a better correspondence between the applied vacuum pressure level at the teat and the milk flow of the teat.

Figure 2:
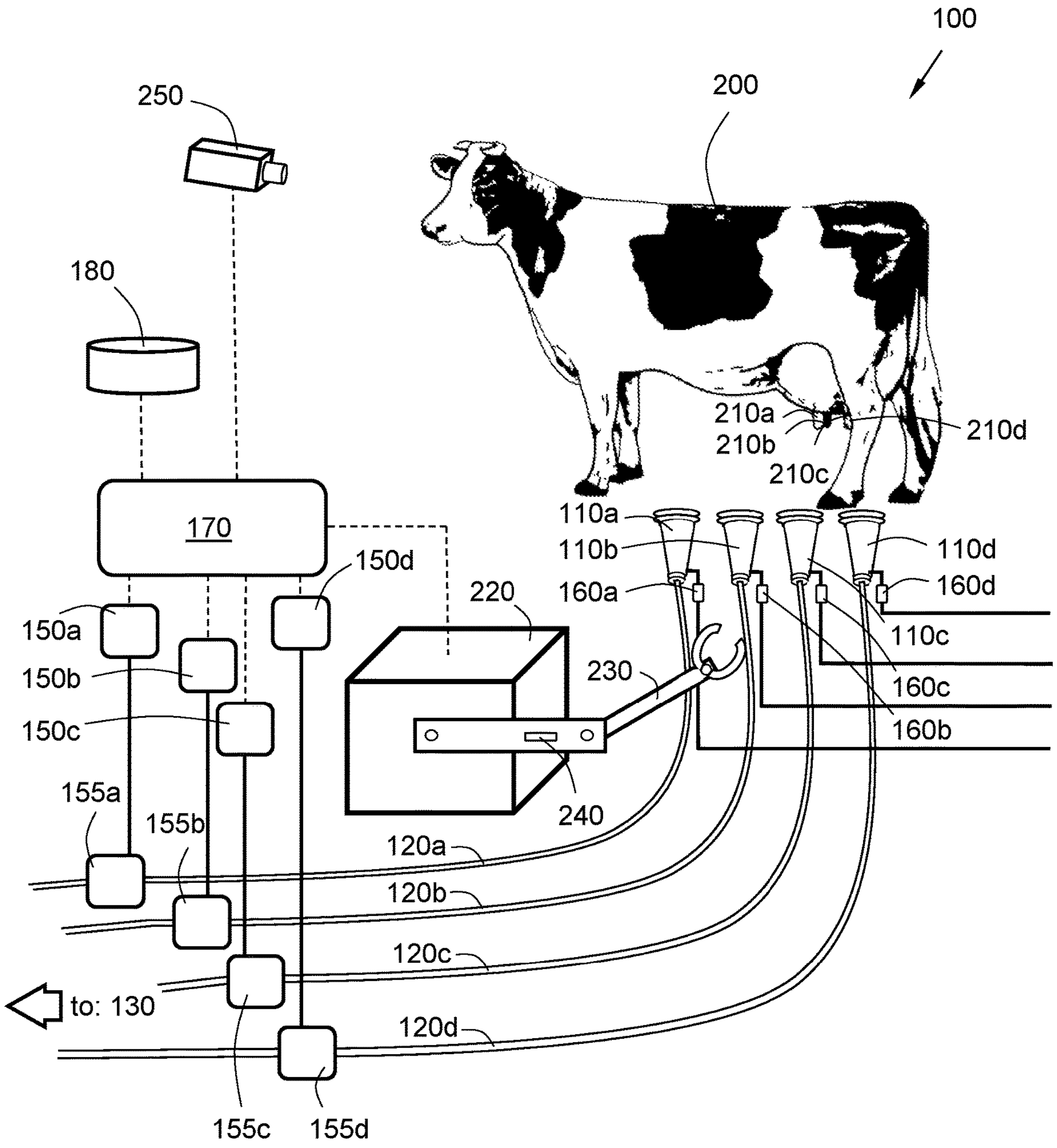
FIG. 2 illustrates a milking system according to an embodiment.

FIG. 2 illustrates a milking system 100 comprising a teat cup placing device 220 such as a milking robot comprising a robotic arm 230, communicatively connected to a sensor 240, such as a camera, video camera, lidar, radar, infrared camera, etc. The sensor 240 is configured to detect position of each teat 210*a*, 210*b*, 210*c*, 210*d* of an animal 200 to be milked.

In the illustrated non-limiting embodiment, teat cup placing device 220 is embodied as a milking robot, which may be part of an Automatic Milking System (AMS), sometimes also referred to as a Voluntary Milking System (VMS), or similar system. The herein disclosed methodology and milking system 100 is not limited to usage involving a milking robot but may be utilised together with any commonly known milking concept such as tied-up animals in a milking parlour and/or manual milking in a milking pit or a rotary milking parlour.

The teat cup placing device 220 may be communicatively connected to the sensor 240, via a wired or wireless connection, thereby obtaining information concerning the respective position of the animal teat 210*a*, 210*b*, 210*c*, 210*d*. The teat cup placing device 220 may be configured to sequentially attach each of the teat cups 110*a*, 110*b*, 110*c*, 110*d* onto the respective teat 210*a*, 210*b*, 210*c*, 210*d* of the animal 200, based on sensor detections made by the sensor 240. The teat cups 110*a*, 110*b*, 110*c*, 110*d* may be kept in a storage magazine or similar storage zone, where the teat cup placing device 220 may pick it up one at the time and attach it onto one of the teats 210*a*, 210*b*, 210*c*, 210*d* and repeat this until all teat cups 110*a*, 110*b*, 110*c*, 110*d* have been attached. The teat cups 110*a*, 110*b*, 110*c*, 110*d* may be attached onto the teats 210*a*, 210*b*, 210*c*, 210*d* in the same sequential order each time of every milking session.

Often the rear teats may provide more milk than the front teats. The milk flow of the rear teats may thus be higher than the milk flow of the front teats. In some embodiments, the teat cups 110*a*, 110*b*, 110*c*, 110*d* may be attached firstly to the rear teats before they are attached to the front teats, as milking out the rear teats may take longer time than milking out the front teats.

Thereby, the overall time for the milking session is reduced, leading to a higher throughput of animals 200 served by the milking system 100; i.e. more animals 200 may be served by the milking system 100, which improves profitability of the farm.

The data concerning the milk extraction curve and/or vacuum profile (or teat specific vacuum pressure level) of each teat 210*a*, 210*b*, 210*c*, 210*d* of each individual animal 200 at the farm may be stored in, for example a digital memory or database 180, communicatively connected to, or comprised in the processing device 170, and later retrieved therefrom. Alternatively, or in addition, the data may be stored in a central database 193, where it may be accessed by a central processing device 192.

The database 180, 193 may store historical milk extraction data and/or vacuum profile and/or vacuum pressure level of teats 210*a*, 210*b*, 210*c*, 210*d* of animals 200 at the farm, associated with an identity reference of the particular animal 200.

The processing device 170 is connected to an animal identifying device 250, such as for example a camera that in conjunction with an image recognition program may identify the animal 200, based on an animal-unique skin pattern and/or visual markings made on the animal 200 such as an animal-unique ID number on an ear tag, an ID number (or other animal-unique marking) on the hide, a bar code comprising the ID number.

Alternatively, in other embodiments, the animal identifying device 250 may be based on a short distance radio wave communication. The identification of the animal 200 may then be made by the animal identifying device 250 in form of a reader or transceiver, obtaining a signal from a Radio-Frequency Identification (RFID) tag associated with the animal 200, for example attached to an ear of the animal 200, carried in a neck lace around the neck of the animal 200, injected under the skin of the animal 200, etc. Instead of RFID, the signalling may be based on Bluetooth, Wi-Fi, Near-Field Communication (NFC), etc.

The signal emitting tag may comprise electronically stored information for uniquely (at least uniquely within the farm) identifying the animal 200.

The animal identifying device 250 may then provide the identity reference of the animal 200, as obtained from the identification device, to the processing device 170, over a wired or wireless communication interface.

When the animal 200 has been identified by the processing device 170 in conjunction with the animal identifying device 250, the robotic arm 230 may start attaching the teat cups 110*a*, 110*b*, 110*c*, 110*d* on the respective teat 210*a*, 210*b*, 210*c*, 210*d*, one-by-one. The teat cups 110*a*, 110*b*, 110*c*, 110*d* may be attached in the same order as discussed above. However, in some alternative embodiments, the teat cups 110*a*, 110*b*, 110*c*, 110*d* may be attached in another order, for example an arbitrary order.

The processing device 170 is communicationally connected to the database 180, 193. Based on the animal-unique information, an animal identity reference, data/information for each specific teat 210*a*, 210*b*, 210*c*, 210*d* of the animal 200 is extracted. The data may comprise milk flow per time unit for each specific teat 210*a*, 210*b*, 210*c*, 210*d*, and/or a vacuum profile to be applied for the specific teat 210*a*, 210*b*, 210*c*, 210*d*, and/or a teat specific vacuum pressure level to be applied at each respective teat 210*a*, 210*b*, 210*c*, 210*d* at a time-period from beginning of the milking session, when the teat cup 110*a*, 110*b*, 110*c*, 110*d* is attached to the respective teat 210*a*, 210*b*, 210*c*, 210*d*.

For example, the applied teat specific vacuum pressure level may be 32 kPa, 35 kPa, 40 kPa or there about, as measured in the teat cup 110*a*, 110*b*, 110*c*, 110*d* under the teat 210*a*, 210*b*, 210*c*, 210*d* by the associated vacuum pressure sensor 160*a*, 160*b*, 160*c*, 160*d*.

In case the stored data may comprise milk flow per time unit for each specific teat 210*a*, 210*b*, 210*c*, 210*d*, the processing device 170 is configured to calculate a corresponding vacuum pressure level to be maintained under the teat 210*a*, 210*b*, 210*c*, 210*d*, according to an algorithm.

In some embodiments, the processing device 170 may maintain the teat specific vacuum pressure level prevailing under the teat 210*a*, 210*b*, 210*c*, 210*d* at a constant level through-out the milking session. As milk is flowing from the teat 210*a*, 210*b*, 210*c*, 210*d* at different flow rates, also the vacuum pressure level under the teat 210*a*, 210*b*, 210*c*, 210*d* will vary. In order to maintain the constant vacuum pressure level prevailing under the teat 210*a*, 210*b*, 210*c*, 210*d*, the applied vacuum pressure level may be adjusted.

The processing device 170 may continuously/repeatedly measure the vacuum pressure under the teat 210*a*, 210*b*, 210*c*, 210*d* with the respective associated vacuum pressure sensors 160*a*, 160*b*, 160*c*, 160*d*. The processing device 170 may then obtain the current/instantaneous (or almost current/instantaneous with some insignificant time delay) vacuum pressure under the teat 210*a*, 210*b*, 210*c*, 210*d* as measured by the associated vacuum pressure sensor 160*a*, 160*b*, 160*c*, 160*d*. The measured vacuum pressure level may be compared with the vacuum profile and/or the teat specific vacuum pressure level to maintain constant during the milking session. Based on the outcome of the comparison, the processing device 170 may generate a command to the vacuum regulator 150*a*, 150*b*, 150*c*, 150*d* associated with the teat cup 110*a*, 110*b*, 110*c*, 110*d* and the teat 210*a*, 210*b*, 210*c*, 210*d*, to adjust the vacuum pressure level under the teat 210*a*, 210*b*, 210*c*, 210*d* and thereby set the vacuum pressure level under the teat 210*a*, 210*b*, 210*c*, 210*d* to either the vacuum pressure level of the vacuum profile and/or the teat specific vacuum pressure level to be maintained constantly during the milking session.

A pulsating pressure is applied when the teat cups 110*a*, 110*b*, 110*c*, 110*d* have been attached on the animal teats 210*a*, 210*b*, 210*c*, 210*d*. The pulsating pressure levels applied to a pulsation chamber via a pulse tube in the teat cup 110*a*, 110*b*, 110*c*, 110*d* may in some embodiments vary between atmospheric pressure during the rest phase D, and system vacuum pressure during the milking phase B in some embodiments. The arrangements for applying pulsating vacuum is not illustrated in the drawings.

Figure 3:
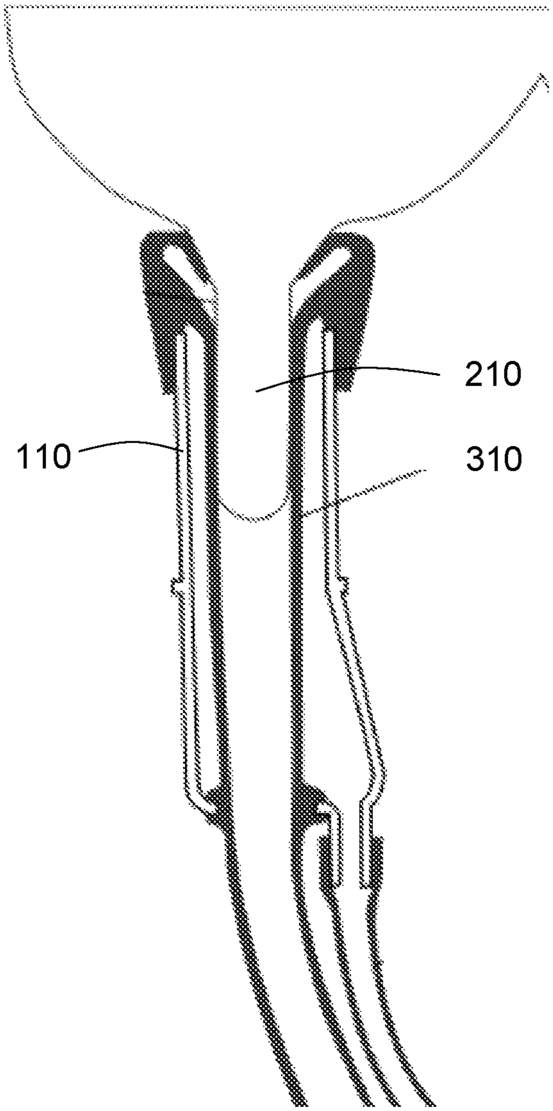
FIG. 3 illustrates details of a milking system concerning a teat cup provided with a liner according to an embodiment.

Thus, sucking is interrupted by rhythmical repeated motions, opening and closing, of a liner 310 in the teat cup 110*a*, 110*b*, 110*c*, 110*d*, as illustrated in FIG. 3. The force exerted by the collapsed liner causes a massage to the teat 210*a*, 210*b*, 210*c*, 210*d*. Consequently, the teats 210*a*, 210*b*, 210*c*, 210*d* are exposed to massage and congestion (e.g. of blood) in the teat end is prevented while oxytocin release and milk ejection is stimulated by the rhythmical movements of the collapsing and opening liner 310 in combination with the applied milking vacuum, mimicking calf suckling.

It is desired to extract the milk of the animal 200 efficiently, during as short time as possible (to allow for more animals per time unit to be served by the milking system 100), without harming or hurting the teats 210*a*, 210*b*, 210*c*, 210*d* by applying an excessive vacuum level under the teat 210*a*, 210*b*, 210*c*, 210*d*.

Thanks to the disclosed concept, a methodology has been developed towards a teat specific adaptation of milk-flow controlled milking, which is efficient, yet conserving teat integrity.

Thus, the milk extraction can be made more efficient, as the applied vacuum pressure level under each teat 210*a*, 210*b*, 210*c*, 210*d* may be different. Thereby, the applied vacuum pressure level under each teat 210*a*, 210*b*, 210*c*, 210*d* may be optimised with respect to the capacity of each respective teat 210*a*, 210*b*, 210*c*, 210*d*, leading to an overall optimisation of the milking session.

When the milking session is about to end, a detachment vacuum pressure may be applied to enable smooth teat cup take off, in some embodiments. The detachment vacuum pressure level may be set to approximately 10-20 kPa, such as for example about 15 kPa.

FIGS. 4A-4D illustrate a respective milk flow curve 401*a*, 401*b*, 401*c*, 401*d*, and a corresponding vacuum profile 402*a*, 402*b*, 402*c*, 402*d* of a respective teat 210*a*, 210*b*, 210*c*, 210*d* of an animal 200 during a milking session 400.

For an animal 200 being milked in a milking robot 220, the teat cups 110*a*, 110*b*, 110*c*, 110*d* are conventionally attached onto the teats 210*a*, 210*b*, 210*c*, 210*d* sequentially by a robotic arm 230, leading to that the milk extraction may be in different phases for different teats 210*a*, 210*b*, 210*c*, 210*d*. for example, when the last teat cup 110*a*, 110*b*, 110*c*, 110*d* is attached onto the last teat, the alveoli milk may have started to be extracted on the first teat 210*a*, 210*b*, 210*c*, 210*d*.

The animal 200 in this case has four teats 210*a*, 210*b*, 210*c*, 210*d*. The four teat cups 110*a*, 110*b*, 110*c*, 110*d* has been attached sequentially for example by the robotic arm 230 one at the time onto the teats 210*a*, 210*b*, 210*c*, 210*d*.

Firstly, the first teat cup 110*a* is attached to the first teat 210*a* at the moment in time to. In case no pre-stimulation has been performed, this point in time to when the first teat cup 110*a* is attached to the first teat 210*a* also is the beginning of the milking session 400.

Figures 4A, 4B, 4C, 4D:
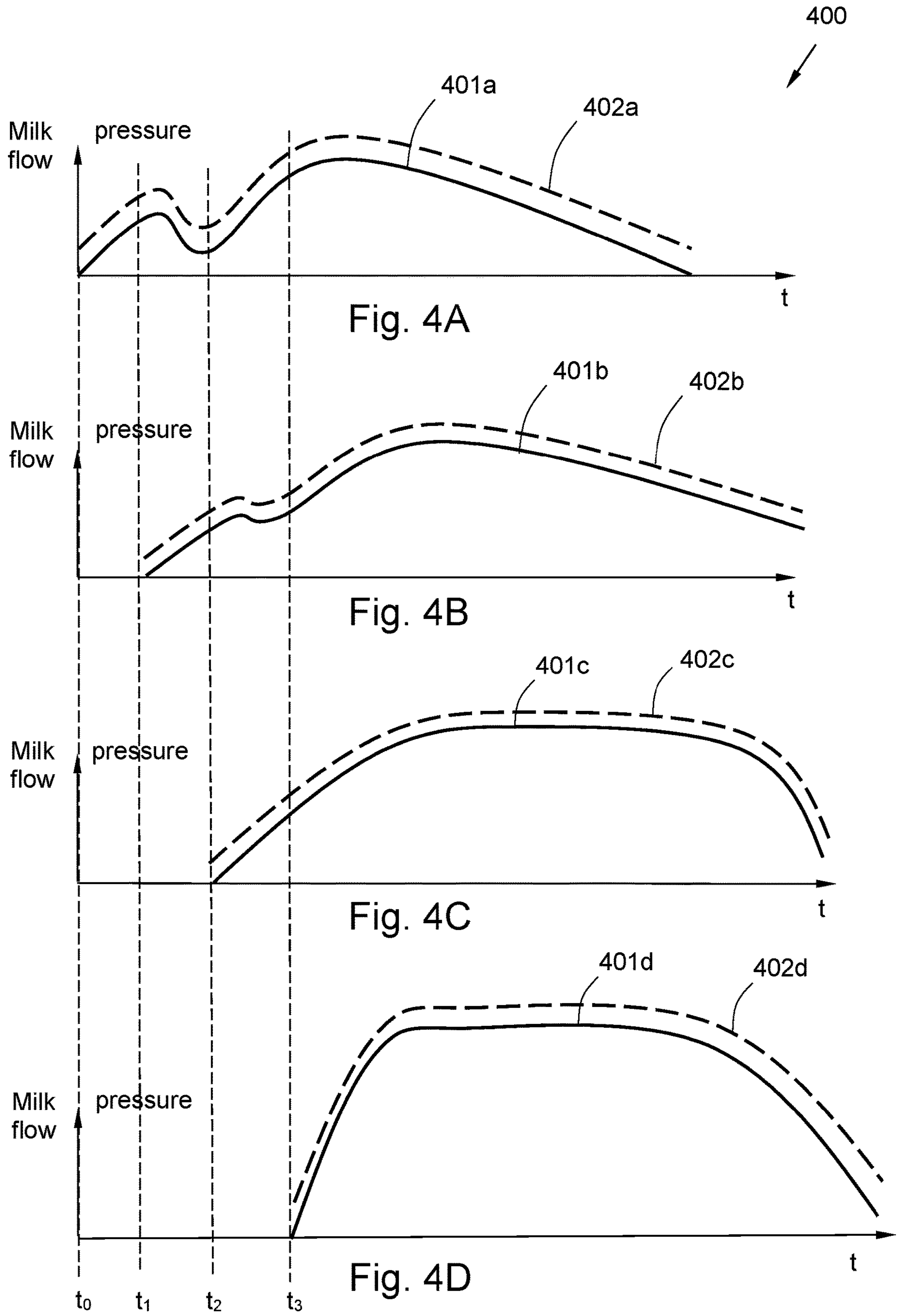
FIG. 4A is a diagram that illustrates an example of milk flow per time unit and vacuum profile for a first teat during milk extraction.
FIG. 4B is a diagram that illustrates an example of milk flow per time unit and vacuum profile for a second teat during milk extraction.
FIG. 4C is a diagram that illustrates an example of milk flow per time unit and vacuum profile for a third teat during milk extraction.
FIG. 4D is a diagram that illustrates an example of milk flow per time unit and vacuum profile for a fourth teat during milk extraction.

The alveoli milk has not been starting to flow from the first teat 210*a*, as schematically illustrated in FIG. 4A. Instead, cistern milk is extracted from the teat 210*a*, and when all the cistern milk has been extracted via the teat cup 110*a*, there may be a dip in the milk flow until the alveoli milk is extracted, as illustrated in the milk flow curve 401*a*.

In this case, the vacuum profile 402*a* has been calculated to correspond to the milk flow curve 401*a* and decrease the vacuum pressure level under the teat 210*a* when the dip before the alveoli milk has started to flow.

FIG. 4B illustrates milk flow curve 401*b* of the second teat 210*b* of the animal 200, and the corresponding vacuum profile 402*b*. The second teat cup 110*b* may be attached onto the second teat 210*b* at time point t1. As illustrated in the milk flow curve 401*b* there may be a brief pause in milk release between the cistern milk evacuation and alveoli milk release of the second teat 210*b*, which also is mirrored in the corresponding vacuum profile 402*b*.

FIG. 4C illustrates milk flow curve 401*c* of the third teat 210*c* of the animal 200, and the corresponding vacuum profile 402*c* at time point t2. The milk flow curve 401*c* shows no tendency to dip between cistern milk evacuation and alveoli milk release. The milk flow of the third teat is fast and firmly raising up to a plateau in the milk flow curve 401*c*. Towards the end of the milking session, the milk flow is decreasing rather fast.

FIG. 4D illustrates milk flow curve 401*d* of the fourth teat 210*d* of the animal 200, and the corresponding vacuum profile 402*d* at time point t3. The milk flow of the fourth teat 210*d* is rising fast up to a plateau in the milk flow curve 401*d*.

Thanks to the provided solution, it is possible to dynamically adjust the vacuum pressure level prevailing under each respective teat 210*a*, 210*b*, 210*c*, 210*d* of the animal 200, de-pending on the current milk flow per time unit, so that an appropriate vacuum pressure level is applied to each teat 210*a*, 210*b*, 210*c*, 210*d*. Thereby the milking efficiency is improved, while eliminating or at least reducing teat damages due to excessive vacuum pressure. It is thereby estimated that teat condition of the animal 200 is increased, and more animals per time unit can be milked by the milking system 100 due to the shortened milking time per animal.

Figure 5:
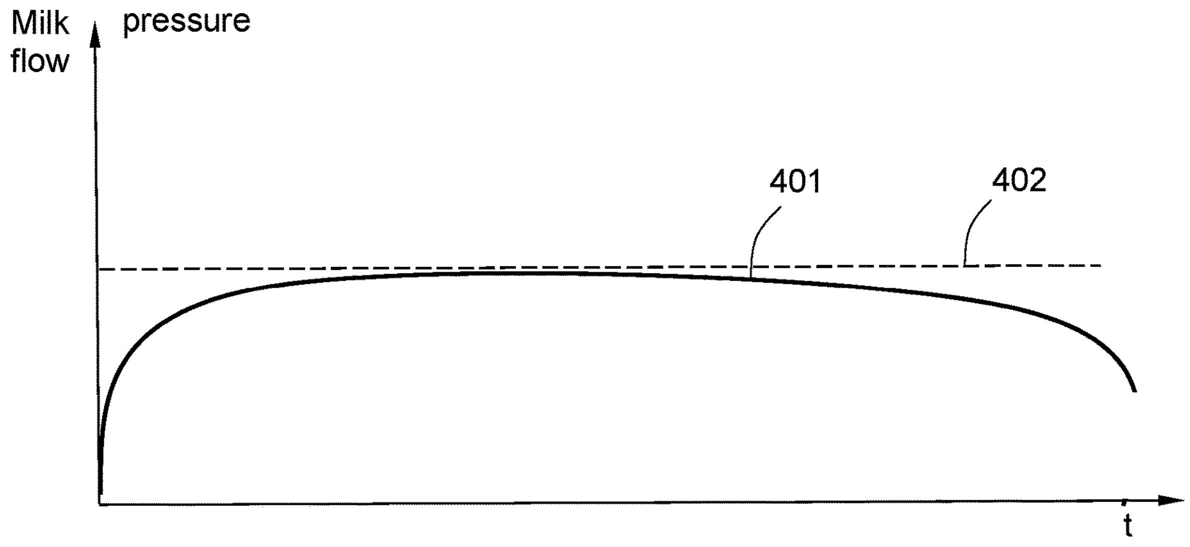
FIG. 5 is a diagram that illustrates an example of milk flow per time unit and vacuum profile for a teat during milk extraction.

FIG. 5 illustrates yet an example of a milk flow curve 401 of a teat 210*a*, 210*b*, 210*c*, 210*d* of the animal 200. In the illustrated embodiment, a vacuum profile 402 to be applied to the teat 210*a*, 210*b*, 210*c*, 210*d* comprises a constant vacuum pressure level under the teat 210*a*, 210*b*, 210*c*, 210*d* to be maintained during the milking session.

The terminology used in the description of the embodiments as illustrated in the accompanying drawings is not intended to be limiting of the described milking system 100; processing device 170 and/or computer program. Various changes, substitutions and/or alterations may be made, without departing from invention embodiments as defined by the appended claims.

The various illustrated embodiments depicted in FIGS. 1-5, and/or discussed in the corresponding respective section of the description may with advantage be combined with each other, for example by mixing and compiling features of some or all of the described embodiments, thereby achieving additional advantages.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A milking system, comprising:

a plurality of teat cups, each teat cup of said teat cups configured to fit on a respective teat of teats of an animal during milk extraction in a milking session;

a plurality of milk evacuation tubes, each one of the milk evacuation tubes connected to a respective one of the plurality of teat cups;

a vacuum pump, configured to generate a vacuum pressure;

a milk tank, connected to the teat cups via the milk evacuation tubes, and also connected to the vacuum pump;

a plurality of vacuum regulators, each one of said vacuum regulators associated with one teat cup of said teat cups and configured to control a vacuum pressure level prevailing in the associated teat cup under the respective teat of the animal during the milk extraction of the milking session;

a plurality of vacuum pressure sensors, each one of said vacuum pressure sensors associated with one teat cup of said teat cups and configured to measure the vacuum pressure level prevailing in the associated teat cup under the respective teat of the animal during the milk extraction of the milking session;

an animal identification sensor configured to capture animal-unique information of the animal;

a database configured to store data, associated with an identity reference of the animal, related to at least one earlier milking session of each one of the teats of the animal; and a processing device communicatively connected to the vacuum regulators, the vacuum pressure sensors, the animal identification sensor, and the database, said processing device configured to:

determine the identity reference of the animal, based on the animal-unique information obtained from the animal identification sensor, extract data of each one of the teats of the identified animal from the database based on the determined identity reference, determine, based on the extracted data, a teat specific vacuum pressure level for each one of the teats to be applied at the teat for a time-period from a beginning of the milking session when the teat cup is attached to the teat, generate respective commands to each vacuum regulator of the vacuum regulators to set the determined teat specific vacuum pressure level at each teat cup of the teat cups, determine, for each one of the teats of the animal, a vacuum profile to be applied to the teat during the milking session, based on the extracted data, and generate respective commands to each one of the vacuum regulators to control the respective vacuum pressure level prevailing under the teat at each associated teat cup in accordance with the vacuum profile determined for the teat milked by the associated teat cup during the milking session, wherein the vacuum profile comprises vacuum pressure levels to be applied under the teat by the associated teat cup which vary over time during the milking session.

2. The milking system according to claim 1, wherein the milking session begins either when a pre-treatment is performed on the first teat or when the first teat cup is attached to the first teat.

3. The milking system according to claim 1, wherein the vacuum profile comprises a constant vacuum pressure level to be maintained under the teat milked by the associated teat cup during the milking session.

4. The milking system according to claim 1, further comprising:

a communication device for communication with a central processing device of a service provider, wherein the processing device is configured to:

provide at least one of i) data of the animal and ii) the identity reference of the animal to the central processing device of the service provider via the communication device, and obtain the vacuum profile to be applied for each respective teat of the animal during the milking session, from the central processing device.

5. The milking system according to claim 1, wherein the processing device is further configured to:

obtain, continuously from the vacuum pressure sensors during the milking session, a respective vacuum pressure level under each one of the teats, compare each one of the obtained respective vacuum pressure levels with a correspondent vacuum profile of the vacuum profiles for the respective teat, and for each one of the obtained vacuum pressure levels, if the obtained vacuum pressure level under a teat differs from a vacuum pressure level of the correspondent vacuum profile for the teat, generate a command to the vacuum regulator of the teat cup milking the teat to adjust the vacuum pressure level at the teat cup, according to the correspondent vacuum profile.

6. The milking system according to claim 5, wherein each teat cup of the teat cups comprises a liner, which is caused to open and close repeatedly under the teat during the milking session, and wherein, for each teat cup, the associated vacuum pressure sensor is configured to measure the vacuum pressure level at least two times during a time period when the liner is open.

7. The milking system according to claim 5, wherein the vacuum pressure sensors are configured to measure the vacuum pressure levels at substantially 10-1000 measurements per second.

8. The milking system according to claim 1, wherein the processing device is further configured to:

obtain, continuously from the vacuum pressure sensors during the milking session, a respective vacuum pressure level under each one of the teats, calculate a rolling average of vacuum pressure levels prevailing at each teat cup, based on a predetermined number of latest vacuum pressure levels obtained from the sensors, compare, for each teat the calculated rolling average of vacuum pressure levels with a correspondent vacuum profile of the vacuum profiles for the teat, and for each one of the obtained vacuum pressure levels, if the obtained vacuum pressure level under a teat differs from a vacuum pressure level of the correspondent vacuum profile of the teat, generate a command to the vacuum regulator of the teat cup milking the teat to adjust the vacuum pressure level at the teat cup, according to the correspondent vacuum profile.

9. The milking system according to claim 1, wherein the processing device is configured to repeatedly:

generate a command to the vacuum regulator of each teat cup, to either increase the vacuum pressure level under the respective teat by a step when a latest obtained vacuum pressure level under the respective teat, obtained from the vacuum pressure sensor associated with the teat cup, is lower than a previously obtained vacuum pressure level under the respective teat, or decrease the vacuum pressure level under the respective teat by the step when the latest obtained vacuum pressure level under the respective teat, obtained from the vacuum pressure sensor associated with the teat cup, exceeds the previously obtained vacuum pressure level under the respective teat.

10. The milking system according to claim 9, wherein a size of the step is proportional to a difference between the latest obtained vacuum pressure level and the previously obtained vacuum pressure level.

11. The milking system according to claim 1, wherein the processing device is further configured to:

detect that the vacuum pressure level under one of the teats exceeds a maximum allowed vacuum pressure level, based on a measurement of the vacuum pressure level obtained from the vacuum pressure sensor associated with the teat cup attached to the teat, and generate a command to the vacuum regulator associated with the teat cup attached to the teat, to decrease the vacuum pressure level under the teat.

12. The milking system according to claim 1, wherein the processing device is further configured to:

provide data related to the latest milking session of each respective teat of the identified animal to the database for storage therein, each data being associated with the respective teat, the identity reference of the animal, and a time reference.

13. The milking system according to claim 1, wherein the processing device is further configured to:

detect a difference between previously stored data related to at least one milking session of one teat of the animal and corresponding data related to the latest milking session of the one teat exceeding a threshold limit, and generate an alert that is output when the difference is detected.

14. The milking system according to claim 1, wherein the processing device is further configured to:

determine a time period between a last milking session of the animal and a current moment in time when the animal is about to commence a subsequent milking session, and determine a teat specific vacuum pressure level to be applied at each respective teat based on the determined time period.

* * * * *